Oct. 6, 1931.  H. S. BENJAMIN  1,825,848
LEVELING DEVICE
Filed Oct. 31, 1929  2 Sheets-Sheet 1

INVENTOR
Harry S. Benjamin
BY
ATTORNEY

Oct. 6, 1931.   H. S. BENJAMIN   1,825,848
LEVELING DEVICE
Filed Oct. 31, 1929   2 Sheets-Sheet 2

INVENTOR
Harry S. Benjamin
BY
ATTORNEY

Patented Oct. 6, 1931

1,825,848

UNITED STATES PATENT OFFICE

HARRY S. BENJAMIN, OF UTICA, NEW YORK

LEVELING DEVICE

Application filed October 31, 1929. Serial No. 403,725.

This invention relates to supporting and leveling means for devices equipped with supporting wheels, which means is especially adapted for use upon weighing scales and the like where it is quite essential that the device be supported in a level position. An object of the present invention is to provide a construction and arrangement whereby by the operation of a single lever the machine may be brought to a firm footing and locked in that position, and whereby the necessary adjustments for leveling the machine may be quickly made and will be maintained. It is also an object to guard against movement of the machine upon its supporting wheels by automatically locking certain of said wheels as others are displaced by rigid supports, and to provide simple and efficient operating mechanism which is concealed within the base of the machine with the operating lever thereof protected against unauthorized manipulation.

With the above and other ends in view, the invention resides in the several matters hereinafter set forth and more particularly pointed out in the appended claims, reference being had to the accompanying drawings in which—

Figure 2:
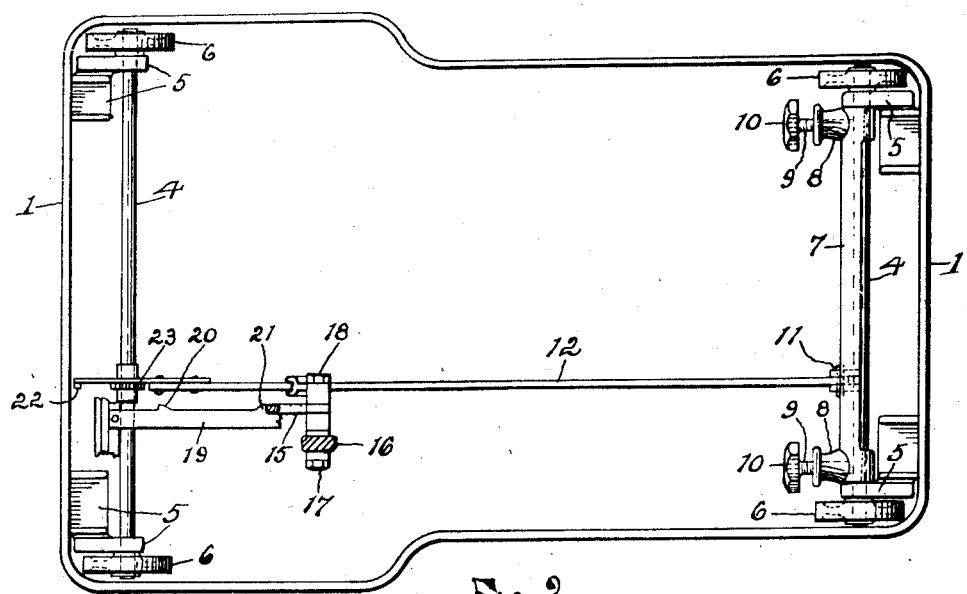
Fig. 2 is an inverted plan view of Figure 1.
Figure 1:
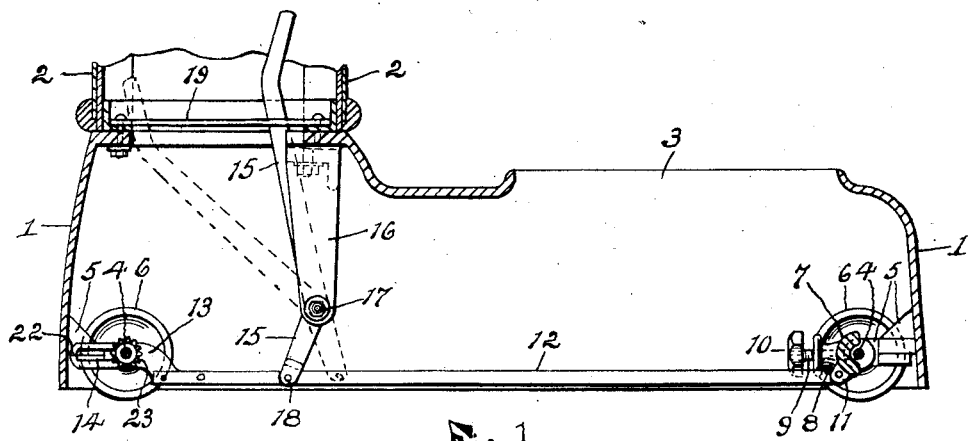
Figure 1 is a longitudinal vertical section through the base of a weighing scale to which mechanism illustrative of an embodiment of the present invention is applied.
Figure 3:
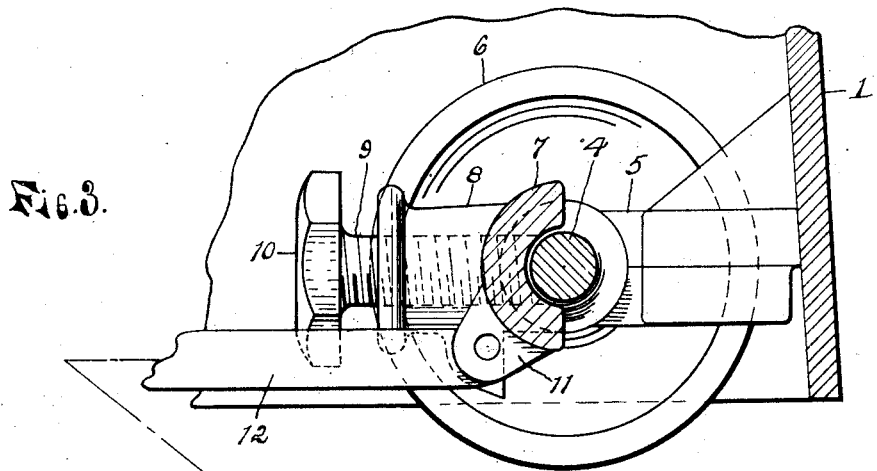
Fig. 3 is an enlarged detail of a portion of the forward end of the base of the machine and showing parts in section.
Figure 4:
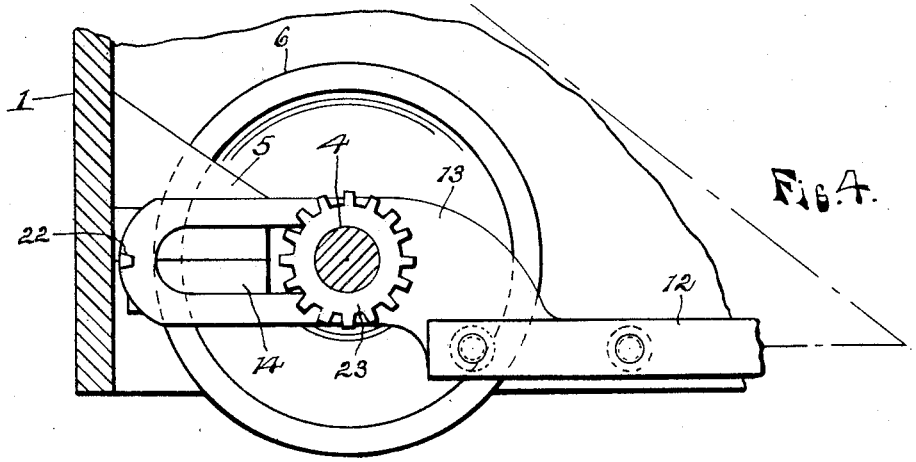
Fig. 4 is a similar detail of a rear end portion of the machine showing means for locking the rear supporting wheels against turning.

As illustrated in the drawings, 1 indicates the usual base of a platform weighing scale upon the rear end portion of which is secured the usual hollow pedestal or upright column 2 forming the usual support for the usual dial and weight operated indicating mechanism (not shown). Over the opening 3 in the top of the base, is supported the usual platform upon lever mechanism housed within the base and all constructed and arranged in the usual manner and therefore not shown. At the front and rear ends of the base, transverse axles 4 are mounted in suitable bearings 5 projecting inwardly from the end walls of the base, and upon each end of each axle is secured a ground or supporting wheel 6 for supporting the machine so that it may be readily moved about upon the floor or ground.

It is essential that machines, such as weighing scales, be supported for use, in a level position so that the weighing mechanism will function properly, and therefore means has been provided for leveling the machine and supporting it rigidly in a level position for use, said means comprising a semi-tubular member 7 sleeved upon the front axle 4 to rotate freely thereon and formed adjacent each end with a laterally extending stud 8 which is bored out and internally screw-threaded to receive a screw 9 having a head 10. By rotating the sleeve 7, the head 10 is brought into contact with the floor, and further rotation will lift the forward end of the base 1 and raise the forward wheels 6 from the floor, thus leveling the base in a longitudinal direction, these rigid legs provided by said studs and screws, rigidly supporting the forward end of said base and tending by their engagement with the floor, to prevent movement of the machine from the position in which it is set on the floor.

Should the base not be level in a transverse direction, this may be readily corrected by turning either of the screws 9 into or out of its socket in its stud 8 thereby, in effect, shortening or lengthening that particular leg, and if it is found that both legs are too long or too short to level the base longitudinally, this may be corrected by turning both screws into or out of their sockets.

To turn the semi-sleeve 7 on the front axle and bring the legs carried thereby into engagement with the floor, an arm 11 is formed integral with said sleeve intermediate its ends, and pivotally attached at one end to this arm 11, is an operating bar 12 which extends longitudinally of the base toward the rear axle 4, said bar being provided at its rear end with an extension 13 provided with a longitudinal slot 14 through which said rear axle extends, this bar being thus supported at its rear end on the rear axle and free to move longitudinally as the arm 11 swings with the turning of the sleeve 7. A lever 15 is pivotally supported intermediate its ends upon a bracket 16 at 17 with its lower end pivotally attached at 18 to the bar 12 and its upper or handle end extended upwardly within the pedestal 2 of the machine alongside a fixed guide bar 19 which is formed with lugs 20 and 21 to engage said handle and hold the same in the position to which it is moved with the sleeve 7 turned into the position shown and the legs swung upwardly away from the floor, as when the handle is engaged with the lug 21, or with the sleeve turned and the legs in supporting position, as when the handle is engaged with the lug 20. Therefore the legs are locked in inoperative position so that the machine may be freely moved about on the floor upon its wheels 6, or in operative position with the legs in contact with the floor and supporting the machine so that it can not be readily moved about. The handle portion of the lever 15 extends upwardly within the hollow pedestal 2 of the machine where it is concealed from view and where it can not be gotten at and operated by an unauthorized person, the pedestal of this class of machine being usually provided with a locked door (not shown) through which the handle is accessible by a person having a key to the door.

In order to prevent the machine from being moved about upon its rear wheels 6 when the legs on the front axle are swung downwardly by the operating handle 15, a lug 22 is formed on the extreme end of the extension 13 of the bar 12 to engage between the teeth of a cog wheel 23 secured upon the rear axle in such a position that when said bar 12 is moved longitudinally by the lever 15 to swing the legs on the front axle down into operative position, said lug will engage said cog wheel and firmly lock the rear axle against turning, and as the rear wheels 6 are secured upon this axle, these wheels are thus locked against turning.

The legs on the front axle are thus swung into position to rigidly support the front end of the base, and the rear wheels which support the rear end of the base are simultaneously locked against turning. Therefore after the machine has been placed in the desired position, it may not be readily moved about without first operating the lever 15 to raise the legs and release the rear axle. Accurate leveling of the machine when sitting upon an uneven surface may be quickly accomplished by turning the screws 9 and thus in effect, lengthening or shortening either or both of the supporting legs.

Obviously, the mechanism embodying the present invention may be applied to any wheel supported device or machine and especially those in which it is essential or desirable that they be maintained level when in operation.

Having thus fully described my invention, what I claim is:—

1. The combination with a base member having supporting wheels, of auxiliary supporting members adapted to be brought into contact with the floor and lift certain of said wheels therefrom to rigidly support said base member, and lever operated means for moving said auxiliary members into operative position, said auxiliary members being adjustable to effect a leveling of said base.

2. The combination with a base member having supporting wheels adjacent each end thereof, of auxiliary supporting members pivotally attached to said base member adjacent one end thereof to swing downwardly into engagement with the floor to rigidly support said end of said base and raise said wheels at said end out of contact with the floor, and means within said base member for swinging said supporting members.

3. The combination with a base member having supporting wheels; of a rigid auxiliary support carried by said base member and comprising auxiliary supporting legs pivotally supported for swinging movement into and out of contact with the ground, and lever mechanism within the base for swinging said supporting legs.

4. The combination with a base member having supporting wheels; of a rigid auxiliary supporting member carried by said base member and movable into and out of contact with the ground, and lever mechanism for moving said auxiliary member into operative position and for locking certain of said supporting wheels against rotation.

5. The combination with a base member having supporting wheels, of a rigid auxiliary supporting member carried by said base member and movable into and out of contact with the ground, locking means operative to lock certain of said wheels against rotation, lever mechanism within said base for swinging said auxiliary member and simultaneously operating said locking means.

6. The combination with a hollow base and supporting wheels therefor one adjacent each corner of said base; of an auxiliary support pivotally attached to said base within the same to be swung downwardly into contact with the ground and lift said wheels at one end of the base out of contact with the ground and form a rigid support for that end of the base, means within the base for swinging said auxiliary support, and locking means operated by said swinging means for locking said wheels at the opposite end of said base against rotation.

7. The combination with a hollow base and supporting wheels therefor; of an auxiliary support movable upon the base therein to bring said auxiliary support into contact with the surface upon which the wheels are supported and lift certain of said wheels from said surface, and lever mechanism housed in said base for operating said auxiliary support and for locking certain of said wheels against rotation.

8. The combination with a hollow base and supporting wheels therefor; of legs pivotally connected to said base within the same to be swung downwardly into contact with the surface upon which the wheels are supported and lift certain of said wheels out of contact with said surface, means for adjusting said legs in length, and lever mechanism housed within said base for swinging said legs and for locking certain of said wheels against rotation.

9. The combination with a hollow base and upright pedestal of a weighing scale and supporting wheels for said base mounted upon transverse axles journalled in bearings upon said base; of rigid supporting legs mounted upon one of said axles to be swung thereon downwardly into contact with the ground, and lever mechanism in said base for so swinging said legs and including an operating lever extending upwardly into said pedestal and means for locking the wheels on the other axle against rotation simultaneously with the swinging of said legs.

10. The combination with the hollow base and upright pedestal thereon of a weighing scale and transverse axles at the front and rear of said base and provided with supporting wheels on the ends of said axles within said base; of a sleeve rotatable upon said front axle and formed with laterally extending members adjustable in length and forming supporting legs adapted to be brought into supporting position by a rotative movement of said sleeve, lever mechanism housed within said base for rotating said sleeve and including an operating handle extending upwardly within said pedestal, and means operated by said lever mechanism for locking the rear axle and wheels against rotation.

11. The combination with the hollow base of a weighing scale, an upright pedestal thereon and transverse axles at the front and rear ends of said base with supporting wheels secured to the ends of said axles within said base; of a sleeve rotatable upon said front axle, said sleeve being formed with laterally extending internally screw threaded lugs, screw members engaged within said lugs and having heads, said lugs and screw members together forming rigid legs adapted to support the base when turned into engagement with the ground by the turning of said sleeve, a bar extending longitudinally of the base and pivotally connected at one end to said sleeve to impart rotative movement thereto upon longitudinal movement of the bar, said bar being formed at its opposite end with a longitudinal slot through which the rear axle extends, a toothed wheel secured upon the rear axle adjacent said bar, a lug on the extension of the bar to engage the teeth of said wheel and lock the rear axle and its supporting wheels against rotative movement, an operating lever pivotally supported within the base with one end pivotally connected to said bar and its opposite end extending upwardly within said pedestal, and means to engage said operating lever and hold the same at either end of its movement, whereby said sleeve is locked against rotative movement with said legs in either operative or inoperative position.

In testimony whereof I affix my signature.

HARRY S. BENJAMIN.